(12) United States Patent
Kato

(10) Patent No.: US 10,694,088 B2
(45) Date of Patent: Jun. 23, 2020

(54) LENS APPARATUS, IMAGING APPARATUS, AND MANUFACTURING METHOD OF THE LENS APPARATUS

(71) Applicant: CANON KABUSHIKI KAISHA, Tokyo (JP)

(72) Inventor: Yuichiro Kato, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/054,486

(22) Filed: Aug. 3, 2018

(65) Prior Publication Data

US 2019/0052781 A1 Feb. 14, 2019

(30) Foreign Application Priority Data

Aug. 8, 2017 (JP) .................................. 2017-152851

(51) Int. Cl.
| | | |
|---|---|---|
| *H04N 5/225* | (2006.01) | |
| *G03B 43/00* | (2006.01) | |
| *G02B 7/04* | (2006.01) | |
| *G03B 17/14* | (2006.01) | |
| *G02B 7/02* | (2006.01) | |

(52) U.S. Cl.
CPC .......... *H04N 5/2254* (2013.01); *G02B 7/025* (2013.01); *G02B 7/04* (2013.01); *G03B 17/14* (2013.01); *G03B 43/00* (2013.01); *H04N 5/2253* (2013.01)

(58) Field of Classification Search
CPC ................................................... H04N 5/2254
See application file for complete search history.

(56) References Cited

U.S. PATENT DOCUMENTS

| | | | | |
|---|---|---|---|---|
| 2013/0155530 A1* | 6/2013 | Miyoshi | ................. | G02B 7/023 359/823 |
| 2014/0354738 A1* | 12/2014 | Yabuta | .................. | H01L 41/187 347/68 |
| 2015/0077840 A1 | 3/2015 | Kim | | |
| 2015/0168669 A1* | 6/2015 | Ishimasa | .................. | G02B 7/08 359/823 |
| 2017/0176705 A1* | 6/2017 | Wang | ................... | H04N 5/2257 |

FOREIGN PATENT DOCUMENTS

| | | |
|---|---|---|
| JP | 2001174682 A | 6/2001 |
| JP | 2006091153 A | 4/2006 |
| JP | 2009258557 A | 11/2009 |
| JP | 2010157971 A | 7/2010 |
| JP | 5383129 B2 | 1/2014 |
| WO | 2012004995 A1 | 1/2012 |

OTHER PUBLICATIONS

Office Action issued in Japanese Application No. 2017-152851 dated Feb. 18, 2020. English translation provided.

\* cited by examiner

*Primary Examiner* — Christopher K Peterson
(74) *Attorney, Agent, or Firm* — Rossi, Kimms & McDowell LLP

(57) ABSTRACT

A lens apparatus includes a lens, a first base member, and a holding frame configured to hold the lens, the holding frame including a flange surface that intersects with an optical axis of the lens. The first base member has a first slope having an acute angle to the flange surface, and the holding frame is fixed to the first base member by adhesive provided between the first slope and the flange surface.

10 Claims, 8 Drawing Sheets

WHERE OPTICAL AXIS IN OPTICAL SYSTEM DOES NOT TILT RELATIVE TO IMAGING PLANE

WHERE OPTICAL AXIS IN OPTICAL SYSTEM TILTS RELATIVE TO IMAGING PLANE

LENS APPARATUS, IMAGING APPARATUS, AND MANUFACTURING METHOD OF THE LENS APPARATUS

BACKGROUND OF THE INVENTION

Field of the Invention

The present invention relates to a lens apparatus having an adjusting mechanism for obtaining a desired optical performance.

Description of the Related Art

For a desired optical performance, an optical adjustment is performed which decenters a lens or lens unit from an optical axis and tilts an axis of a lens or changes a distance between adjacent lenses. Along with the recent demands for the miniaturization and high performance of an interchangeable lens, the lens becomes highly sensitive and the optical adjustment becomes more important. After the optical adjustment, the lens is fixed by the adhesion etc. A UV curing type adhesive curable by the UV light irradiation is widely used for the adhesive for the optical adjustment.

Japanese Patent No. ("JP") 5,383,129 discloses a lens barrel that arranges an extender provided to a lens frame and a convex part provided to an adjustment frame as a base at different positions in the optical axis direction, and fixes the lens frame and the adjustment frame by filling adhesive in a space between the extender and the convex.

However, the extender and the convex overlap each other in the optical axis direction in the lens barrel disclosed in JP 5,383,129, and it is thus difficult to visually recognize an adhesive application range and to apply the adhesive to intended spot. Hence, the holding strength against impacts may become insufficient and the optical performance of the lens barrel may degrade. An overlapping part between the extender and the convex part in the optical axis direction becomes a shade, and it is difficult to properly irradiate the UV light onto the adhesive, causing insufficient curing. Moreover, when decentering from the optical axis as well as the optical adjustment in the thrust direction is necessary, the decentering reduces the overlapping range between the extender and the convex part and an adhesive amount, causing an insufficient adhesion strength. As a result, the durability of the lens apparatus may lower.

SUMMARY OF THE INVENTION

The present invention provides a lens apparatus, an imaging apparatus, and a manufacturing method of the lens apparatus, which has a durability higher than ever.

A lens apparatus according to one aspect of the present invention includes a lens, a first base member, and a holding frame configured to hold the lens, the holding frame including a flange surface that intersects with an optical axis of the lens. The first base member has a first slope having an acute angle to the flange surface, and the holding frame is fixed to the first base member by adhesive provided between the first slope and the flange surface. The first slope may be at least a part of an internal wall of a hole part provided to the first base member.

An imaging apparatus according to another aspect includes the above lens apparatus, and an image sensor configured to photoelectrically convert an optical image formed by the lens apparatus.

A manufacturing method of a lens apparatus according to still another aspect of the present invention that includes a lens, a first base member, a holding frame that is configured to hold the lens and has a flange surface that intersects with an optical axis of the lens. The manufacturing method includes a first step of applying adhesive between a first slope of the first base member and the flange surface, and a second step of applying the adhesive to a second slope of the first base member and the wall surface after the first step. The first slope forms an acute angle to the flange surface, and the second slope forms an acute angle to the wall surface.

Further features of the present invention will become apparent from the following description of exemplary embodiments with reference to the attached drawings.

DESCRIPTION OF THE EMBODIMENTS

Referring now to the accompanying drawings, a description will be given of embodiments of the present invention.

First Embodiment

Figure 1:
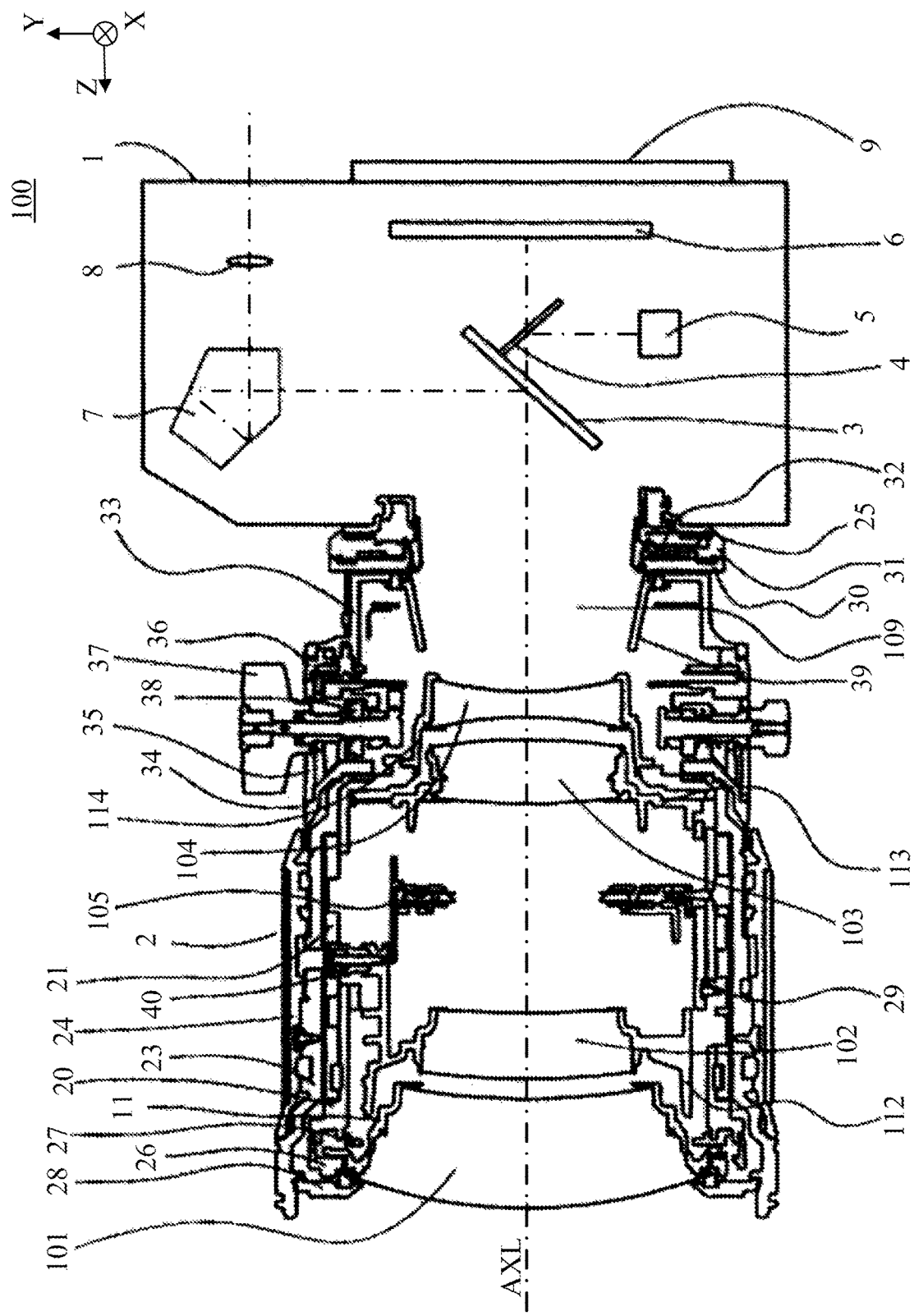
FIG. 1 is a sectional view when an imaging apparatus according to a first embodiment focuses on infinity.
Figure 2:
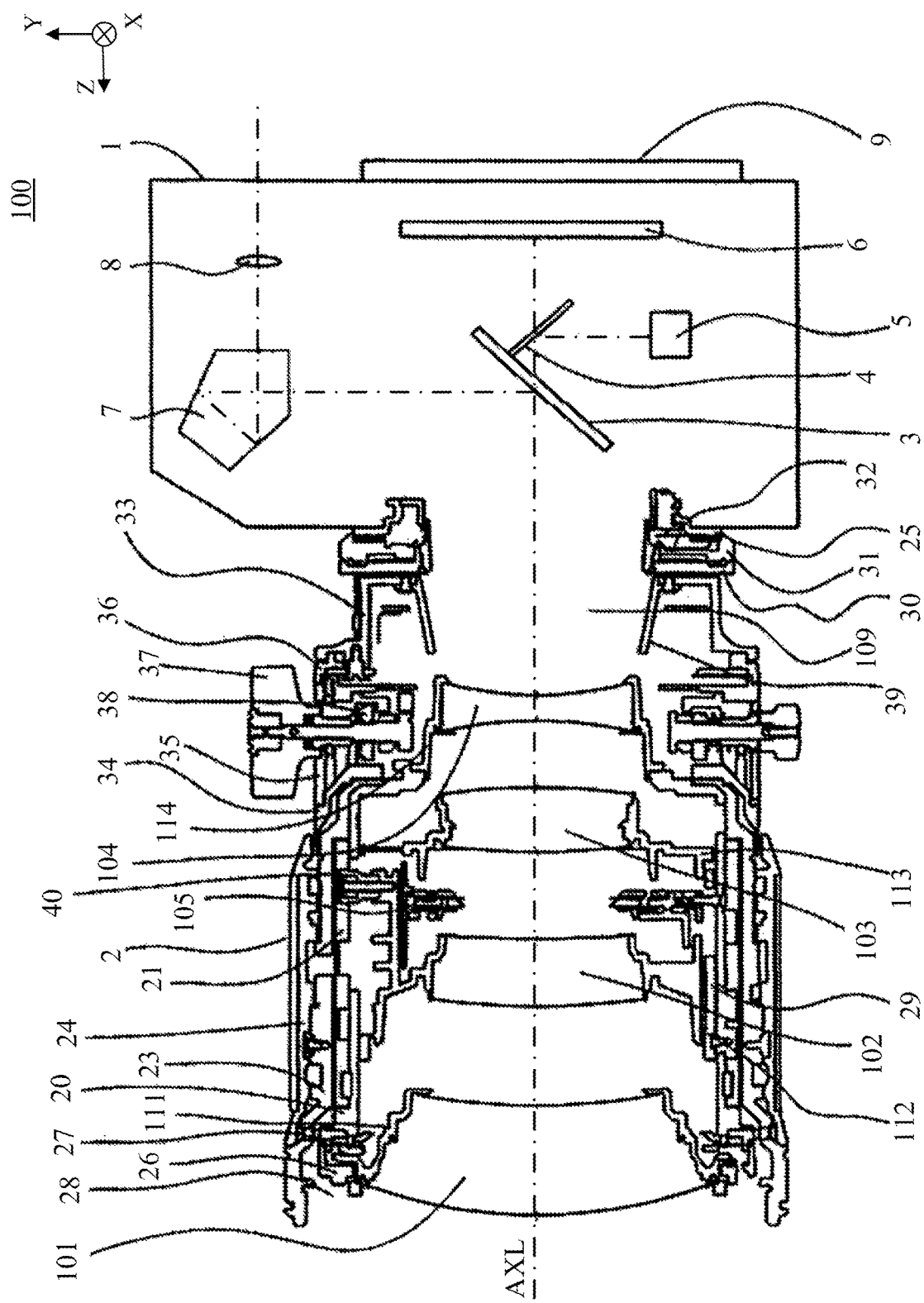
FIG. 2 is a sectional view when the imaging apparatus according to the first embodiment focuses on the near side.

Referring now to FIGS. 1 and 2, a description will be given of a structure of an imaging apparatus according to a first embodiment of the present invention. FIG. 1 is a sectional view when an imaging apparatus 100 according to this embodiment focuses on infinity. FIG. 2 is a sectional view when the imaging apparatus 100 focuses the near (short distance) side. In FIGS. 1 and 2, a Z direction is set to an optical axis (lens optical axis, imaging optical axis) AXL direction, an X direction is set to a lateral direction in two directions orthogonal to the optical axis AXL and parallel to the imaging plane in the image sensor 6, and a Y direction is set to the longitudinal direction in the two directions.

Reference numeral 1 denotes a camera body (imaging apparatus body). Reference numeral 2 denotes an interchangeable lens (lens apparatus) detachably attached to the camera body 1. A structure of the camera body 1 will now be described. In the (infinity focused) state illustrated in FIG. 1, a main mirror 3 is disposed on an optical path of light from the interchangeable lens 2, reflects and leads part of a light flux to finder optical systems 7 and 8, and transmits a remaining light flux. A sub-mirror 4 is disposed behind (on an image plane side) of the main mirror 3, reflects the light flux that has transmitted the main mirror 3, and leads it to a focus detecting unit 5. The main mirror 3 and the sub-mirror 4 can be integrally inserted into and retreated from the optical path by an unillustrated driving mechanism. The focus detecting unit 5 performs a focus detection by a so-called known phase difference detection method (or detects a focus state of the interchangeable lens 2). Reference numeral 6 denotes an image sensor, such as a CCD sensor and a CMOS sensor, photoelectrically converts an optical image formed via the interchangeable lens 2, and outputs an imaging signal (image signal). The object image (optical image) is formed by a light flux from the interchangeable lens 2 on a light receiving surface (image plane) of the image sensor 6. Reference numeral 9 denotes a display panel (display unit) that serves to display a variety of imaging information and an image from an unillustrated signal processor configured to perform predetermined signal processing for a signal from the image sensor 6 as an input signal.

The camera body 1 is a single-lens reflex camera that includes the main mirror 3, the sub-mirror 4, the focus detecting unit 5, the image sensor 6, and the finder optical systems 7 and 8. However, the present invention is not limited to this embodiment, and may be applied, for example, to a mirrorless camera (nonreflex camera) having no main mirror 3 or sub-mirror 4. The image sensor 6 in the camera body 1 may have focus detecting pixels (AF pixels) configured to generate an image signal used for the AF by an image plane phase difference detecting method, rather than the focus detecting unit 5. A focus detection by the contrast detecting method may be performed based on the signal obtained from the image sensor 6.

The interchangeable lens 2 as an optical system includes, in order from the object side to the image side, a first lens unit 101, a second lens unit 102, a third lens unit 103, and a fourth lens unit 104. Reference numeral 105 is a diaphragm (aperture stop) unit that adjusts the light amount incident on the image sensor 6. The first lens unit 101 to the fourth lens unit 104 and the diaphragm unit 105 constitute part of the imaging optical system. The first lens unit 101, the second lens unit 102, the third lens unit 103, and the fourth lens unit 104 are held by a first lens holding frame 111, a second lens holding frame 112, a third lens holding frame 113, and a fourth lens holding frame 114. The diaphragm unit 105 is disposed between the second lens unit 102 and the third lens unit 103. The diaphragm unit 105 and a control board (controller) 109 mounted with a control circuit, such as a microcomputer, are connected to each other via an unillustrated flexible printed substrate.

A guide cylinder (second base member) 20 is fixed to a tilt cover in the following TS mechanism part. A cam ring 21 is engaged with an outer circumference of the guide cylinder 20, and supported rotatably at a fixed position. A fixed cylinder 23 is fixed to the guide cylinder 20, and has a hood attachment part used to attach a hood, a filter, a cap etc., near an object side end of the fixed cylinder 23. An MF (manual focus) operation ring 24 is engaged with the outer circumference of the fixed cylinder 23, supported rotatably at a fixed position, and coupled with the cam ring 21 by an unillustrated key mechanism. As the MF operation ring 24 rotates, the cam ring 21 rotates by the same or corresponding amount. The position of the MF operation ring 24 in the rotating direction is detected by an unillustrated sensor, and connected by the control board 109 via an unillustrated flexible substrate. An adjustment base (first base member) 26 is attached and fixed to the object side end of the guide cylinder 20.

A rotational ring (second adjusting member) 27 has a stair middle surface 27a and a stair top surface 27b, and is held rotatably with the first lens holding frame 111 around the guide cylinder 20 as an axis between the guide cylinder 20 and the adjustment base 26. In other words, the rotational ring 27 is supported rotatably by the guide cylinder 20, and adjusts the position of the first lens holding frame 111 in the optical axis direction as the first lens holding frame 111 moves back and forth along the optical axis AXL due to the rotations. In addition, the first lens holder 111 decenters on a surface that contacts the rotational ring 27 for the optical adjustment of the first lens unit 101. A detailed description of the optical adjustment for the first lens unit 101 will be given later.

A front ring 28 is an exterior component fixed to the fixed cylinder 23 after the optical adjustment of the first lens unit 101. The fourth lens unit 104 and the fourth lens holding frame 114 are fixed to the guide cylinder 20. In the second lens unit 102 and the second lens holding frame 112, a cam roller 40 screwed onto the second lens holding frame 112 is engaged with a cam groove formed on an internal surface of the cam cylinder 21, and moves back and fourth along the cam locus as the cam ring 21 rotates. A coupling ring 29 is a relative position changing member having an approximately cylindrical shape, and fixed to the third lens holding frame 113 near the end on the image plane side. An unillustrated cam roller is fixed to the coupling ring 29 and engaged with a cam groove in the cam ring 21 near the end on the object side. In the third lens unit 103 and the third lens holding frame 113, a cam roller screwed on the coupling ring 29 is engaged with a cam groove formed on an internal surface of the cam cylinder 21, and moves back and fourth along the cam locus as the cam ring 21 rotates.

As described above, as the user rotates the MF operation ring 24, the cam ring 21 rotates. Focusing at an arbitrary position from the infinity (INF) to the near side (MOD) is available by changing a distance between the second lens unit 102 and the third lens unit 103 (lens interval). FIG. 1 illustrates the infinity focused state in which the second lens unit 102 and the third lens unit 103 are most separated from each other. FIG. 2 illustrates a short-distance focused state in which the MF operating ring 24 and the cam ring 21 rotate and the second lens unit 102 and the third lens unit 103 are closest to each other. A diaphragm fixing screw 108 fixes the diaphragm unit 105, and is fixed to the guide cylinder 20. In the short-distance focused state, the diaphragm unit 105 collides with none of each of the second lens unit 102, the second lens holding frame 112, the third lens unit 103, and the third lens holding frame 113.

Next follows a description of a mechanism that enables the interchangeable lens 2 to tilt, shift, and revolve. A revolver 30 serves to rotate around the optical axis AXL, the entire lens located on the object side of the revolver 30, and is connected rotatably to a fixed part 31 fixed to a mount 25 as a connector with the camera body 1. An angle detector 32 detects a rotating amount (angle) around the optical axis ALX.

A shifter 33 serves to parallel move the entire lens located on the object side of the shifter 33 in a direction perpendicular to the optical axis AXL, and is coupled shiftably with the revolver 30. This embodiment shiftably couples the shifter 33 and the revolver 30 with each other through a dovetail groove, and converts a rotary movement by an unillustrated shifting knob into a linear movement for a shift operation. A positive and negative determination that represents a shift amount and a moving direction of the shift amount is made based on the signal detected by the unillustrated sensor. A light shield ring 39 hides the internal structure from the mount side and is fixed to the shifter 33.

A tilter 35 serves to tilt the entire lens located on the object side of the tilter 35 relative to the camera body 1 around an axis perpendicular to the optical axis AXL as the rotating center axis. More specifically, a contact surface between a TS (tilt and shift) revolver 36 and the tilter 35 is formed as part of a circle of a convex surface and a concave surface having the same center axis and the same radius. Tilting is available by converting a rotation of a gear directly connected to the tilt operating knob 37 into a rotation with a large (speed) reduction ratio of an outer gear having an axis at a tilt rotating center. A tilt amount detector 38 detects an actual tilt amount including the positive and negative determination as the moving direction. A combination of the tilt and the shift can be used in all directions by using the revolver 30 to the tilt amount detector 38. The TS revolver 36 serves to rotate the tilter 35 and the shifter 33 relative to each other. Herein, the revolver 30 according to this embodiment can rotate in a range of ±90° and stop for each 15° by an unillustrated click mechanism. The TS revolver 36 can set a relative angle of the tilter 35 in the rotating direction to 30°, 60°, and 90° through the unillustrated click mechanism based on the shift direction of the shifter 33. The tilter 35 and the guide cylinder 20 are fixed by an unillustrated fastener. Reference numeral 34 denotes a tilt cover fixed to the object side of the tilter 35, and fixes the guide cylinder 20, as described above.

This imaging apparatus 100 provides the manual focus as the unillustrated release button provided to the camera body 1 is operated, exposes the imaging apparatus 100 after the exposure is determined, and records an acquired image.

Figure 3A:
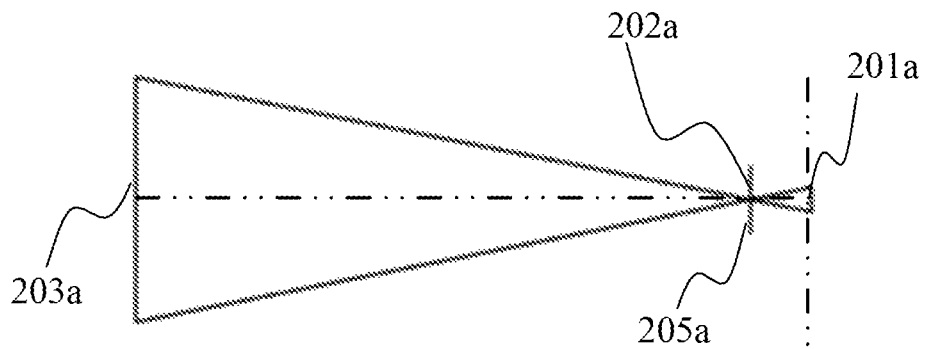
FIGS. 3A and 3B are explain the Scheimpflug principle.
Figure 3B:
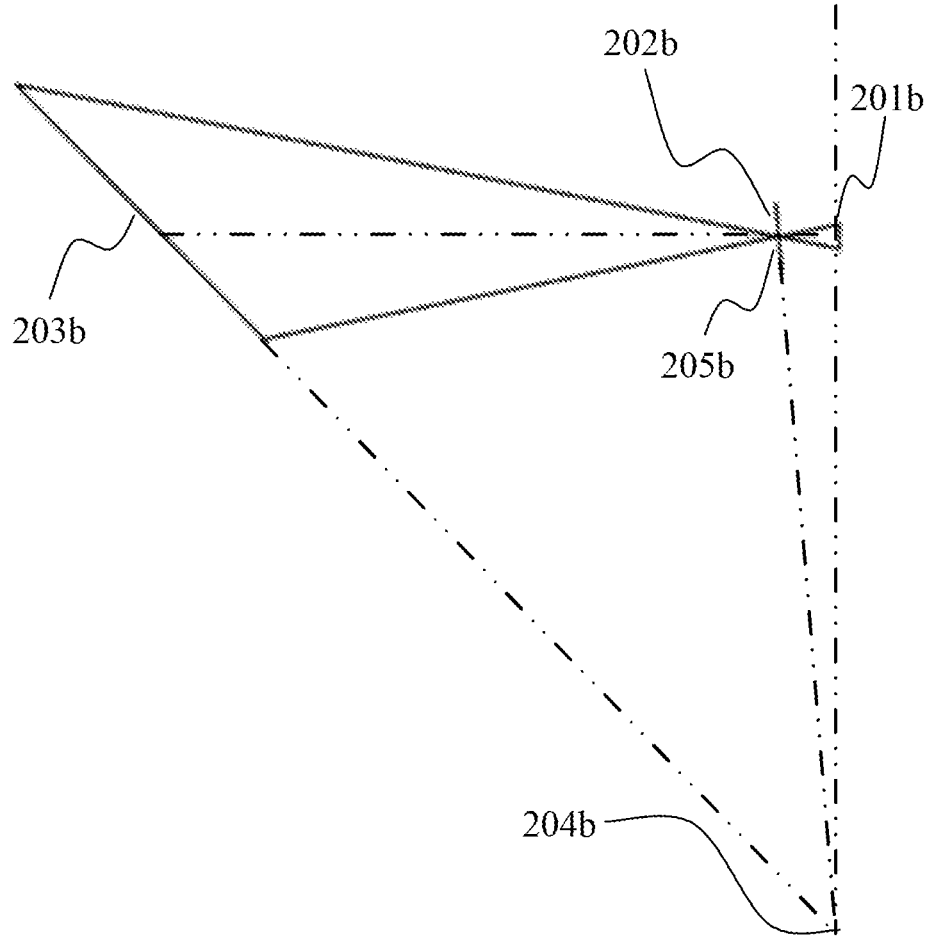

Referring now to FIGS. 3A and 3B, a description will be given of the Scheimpflug principle. FIGS. 3A and 3B are explanatory views of the Scheimpflug principle. Where the optical axis in the optical system in the interchangeable lens 2 inclines to the image sensor 6, a focusable range on the object side is determined by the Scheimpflug principle. FIG. 3A illustrates a focusable range when the optical axis in the optical system does not incline to the image plane. FIG. 3B illustrates a focusable range when the optical axis in the optical system inclines to the image plane.

In FIGS. 3A and 3B, reference numerals 201a and 201b denote image planes, reference numerals 202a and 202b denote (imaging) optical systems, reference numerals 203a and 203b denote object planes to be focused, and reference numerals 205a and 205b are principal planes in the optical systems. According to the Scheimpflug principle, the object plane 203b passes an intersection point 204b when the image plane 201b intersects with the principal plane 205b in the optical system at the intersection 204b on a certain line, as illustrated in FIG. 3B.

When an object to be captured has a depth, the front side of the object to the backside of object can be focused by tilting the object plane 203b along the depth. In focusing deep part with a lens that does not have a tilt and shift (TS) mechanism, a diaphragm is generally used to widen the depth of field. On the other hand, a TS lens can focus on deep part through tilting even with a released diaphragm. On the contrary, the object plane 203b can be crossed with the depth direction of the object by an approximately right angle by tilting the principal plane in the optical system 202b in a direction opposite to the inclination of the object having a depth. In this case, the focusable range can be extremely narrowed, and thus a georama like image can be obtained.

Figure 4:
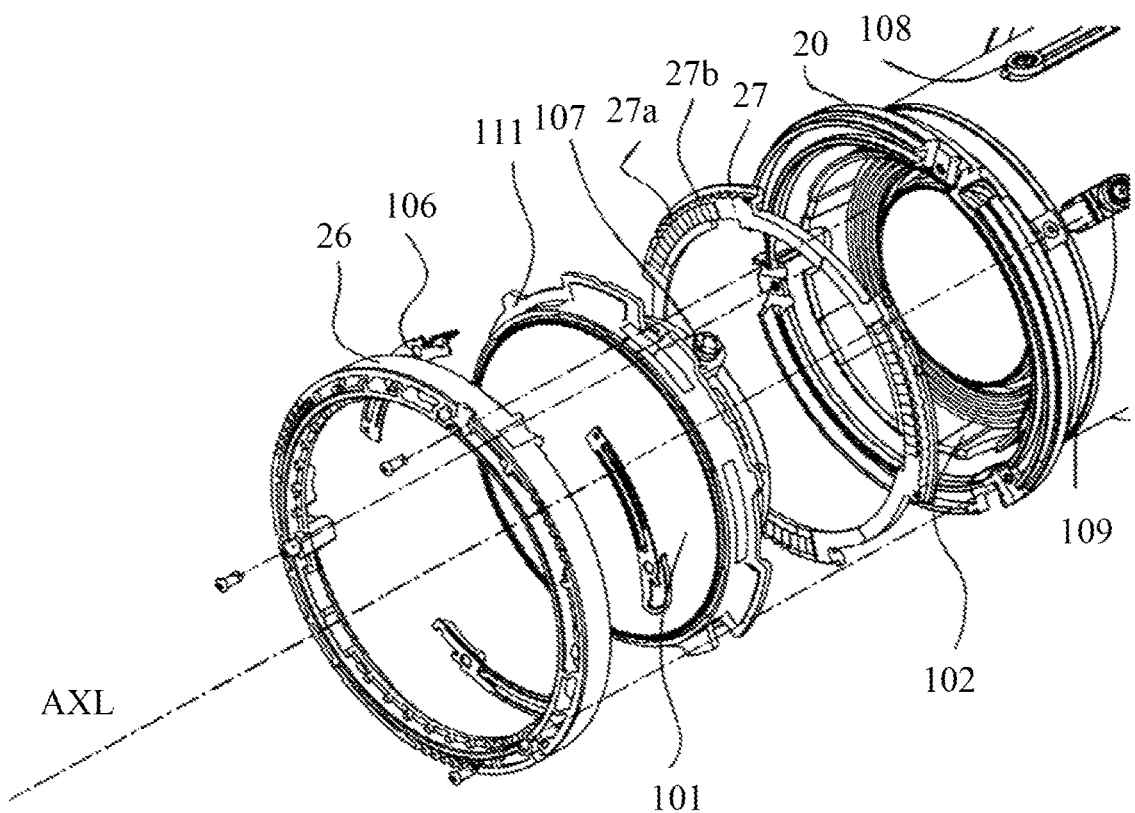
FIG. 4 is an exploded perspective view of a first lens unit according to the first embodiment.
Figure 5:
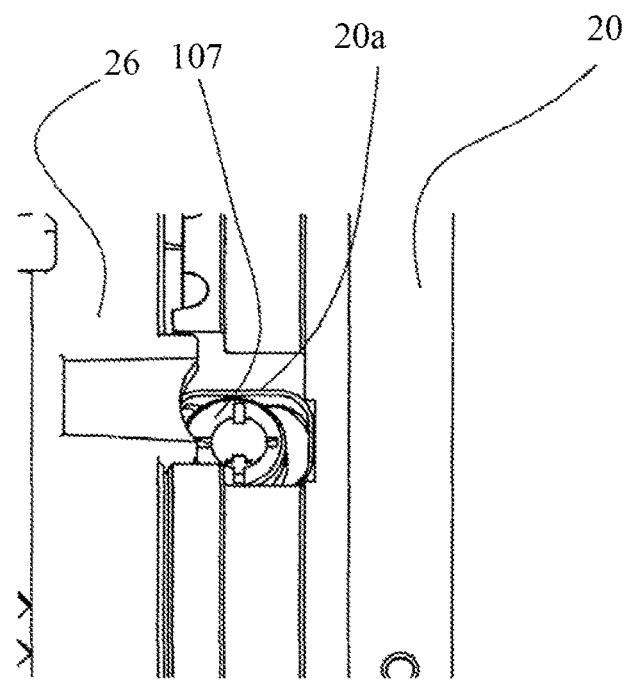
FIG. 5 is a detailed view of a first-unit cam roller according to the first embodiment.

Referring now to FIGS. 4 and 5, a description will be given of the optical adjustment and the holding method of the first lens unit 101 and the first lens holding frame 111. FIG. 4 is an exploded perspective view of the first lens unit 101. FIG. 5 is a detailed view of the first-unit cam roller 107. The first-unit cam roller (first adjusting member or adjuster) 107 adjusts a position of the first lens holding frame 111 relative to the adjustment base 26. In the optical adjusting of the first lens unit 101, all components are assembled from the object side for the guide cylinder 20. Initially, the rotational ring 27 is brought into contact with the guide cylinder 20, and held rotatably around the optical axis AXL. The first lens holding frame 111 is configured to contact the stair middle surface 27a provided on the rotational ring 27. The first-unit cam rollers 107 are arranged at regular intervals of 120° and screwed at three positions on the first lens holding frame 111. This configuration enables the first-unit cam rollers 107 to adjust the inclination of the first lens holding frame 111 to the optical axis AXL and the position of the first lens holding frame 111 (adjust the position in the axial direction and decentering) in each of the direction along the optical axis AXL and the direction orthogonal to the optical axis AXL. The present invention does not necessarily require the structure in which the first-unit cam rollers 107 adjust all of the inclination, the position in the axial direction, and decentering. The first-unit cam rollers 107 may perform at least one of these three adjustments. Alternatively, the first-unit cam rollers 107 may adjust the inclination or decentering.

However, in assembly of bringing into contact with the step middle surface 27a on the rotational ring 27, the first-unit cam rollers 107 are not fixed to the first lens holding frame 111. The first-unit cam rollers 107 are assembled through holes 20a in the guide cylinder 20 after the adjustment base 26 is assembled (see FIG. 5). By rotating the first-unit cam rollers 107 relative to the first lens holding frame 111, the first lens holding frame 111 is decentered on the stair middle surface 27a which contacts the first lens holding frame 111. This configuration can realize the optical adjustment in the decentering direction of the first lens unit 101.

Three first-unit urging springs 106 are fixed on the rear surface (image side) of the adjustment base 26. While the first-unit urging spring 106 can be fixed with the adhesive or screws, the adjustment base 26 is a molded component and thus this embodiment thermally caulks it. The adjustment base 26 is fixed to the guide cylinder 20 by three screws so as to cover the first lens holding frame 111 and the rotational ring 27. In this assembled state, the first lens holding frame 111 is forced by the first-unit urging springs 106 so that the first lens holding frame 111 contacts the stair middle surface 27a on the rotational ring 27. Thereby, in decentering the first lens holding frame 111, the first lens holding frame 111 always contacts the stair middle surface 27a. In addition, the rotational ring 27 is forced against the guide cylinder 20 or the first-unit urging springs 106 forces two components including the first lens holding frame 111 and the rotational ring 27 together.

When the adjustment base 26 is fixed to the guide cylinder 20, the first lens holding frame 111 and the rotational ring 27 are provisionally held before the optical adjustment. As described above, when the first-unit cam roller 107 is fixed to the first lens holding frame 111, the first lens holding frame 111 can be decentered. As the rotational ring 27 rotates, the contact position on the stair middle surface 27a which the first lens holding frame 111 contacts changes. The surfaces of the stairs part have different heights in the optical axis direction, and the first lens holding frame 111 can move in the optical axis direction. A click undulator 27d is provided on the rotational ring 27, and contacts the first-unit urging springs 106. The click undulator 27d has an undulation shape along the circumferential direction of the rotational ring 27, and provides a so-called click sense when the rotational ring 27 rotates.

Reference numeral 108 denotes a second-unit cam roller screwed onto the second lens holding frame 112, reference numeral 109 denotes a third-unit cam roller screwed onto the third lens holding frame 113, and they are engaged with unillustrated cam grooves on the cam ring 21. As the cam ring 21 rotates, the second lens holding frame 112 and the third lens holding frame 113 responsively move back and forth in the optical axis direction to desired positions.

Figure 6:
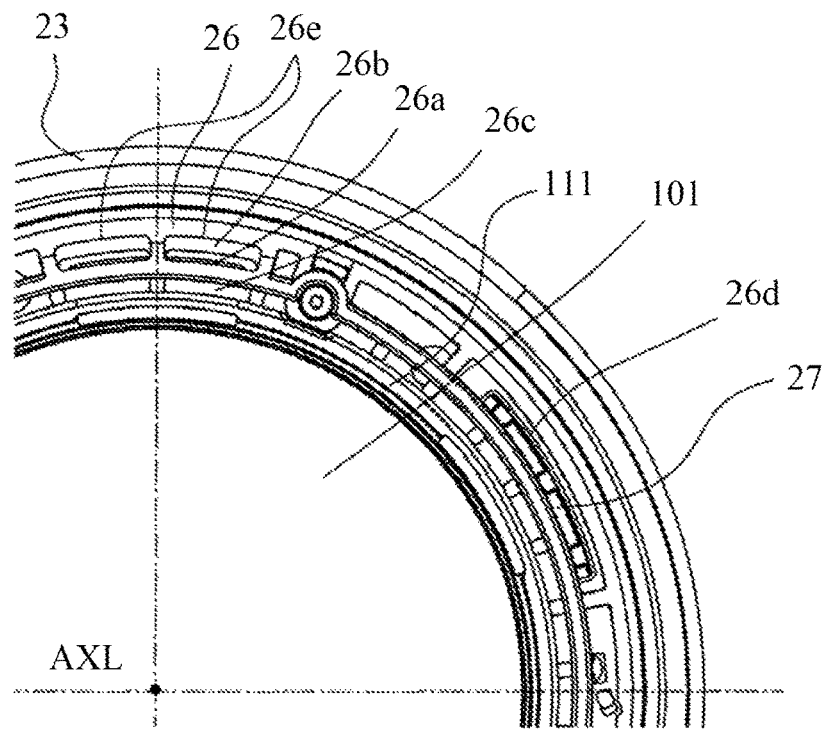
FIG. 6 is a front view of a first lens unit according to the first embodiment.

Referring now to FIG. 6, a description will be given of an assembly of the adjustment base 26. FIG. 6 is a front view of the first lens unit 101 after the adjustment base 26 is assembled. An adhesive penetration hole (through-hole) 26e is a hole part (penetration hole) as a reservoir of the adhesive that adheres the first lens holding frame 111 and the adjustment base 26 to each other. A first slope 26a is an internal surface (inner wall on the side close to the optical axis) in the adhesive penetration hole 26e formed in the adjustment base 26. A third slope 26b is an outer surface (inner wall on the side far from the optical axis) in the adhesive penetration hole 26e. There are two adhesive penetration holes 26e at positions that slightly shift from each other in the circumferential direction on the upper side of the interchangeable lens 2. This pair of adhesive penetration holes 26e are arranged at regular intervals of 120° in the circumferential direction and there are totally six adhesive penetration holes 26e. The adjustment base 26 has a plurality of first slopes 26a.

An adjustment penetration hole 26d is a penetration hole (through-hole) different from the adhesive penetration hole 26e. The rotational ring 27 can be visually recognized through the adjustment penetration hole 26d. The rotational ring 27 is enclosed by the adjustment base 26 and made rotatable by inserting an unillustrated rod-shaped tool into the adjustment penetration hole 26d and by engaging the tool with the concave part in the rotational ring 27. The second slope 26c is located inside the first slope 26a, and the space formed by a cylinder part 111d in the first lens holding frame 111 and the second slope 26c can be used for the adhesion.

Figure 7:
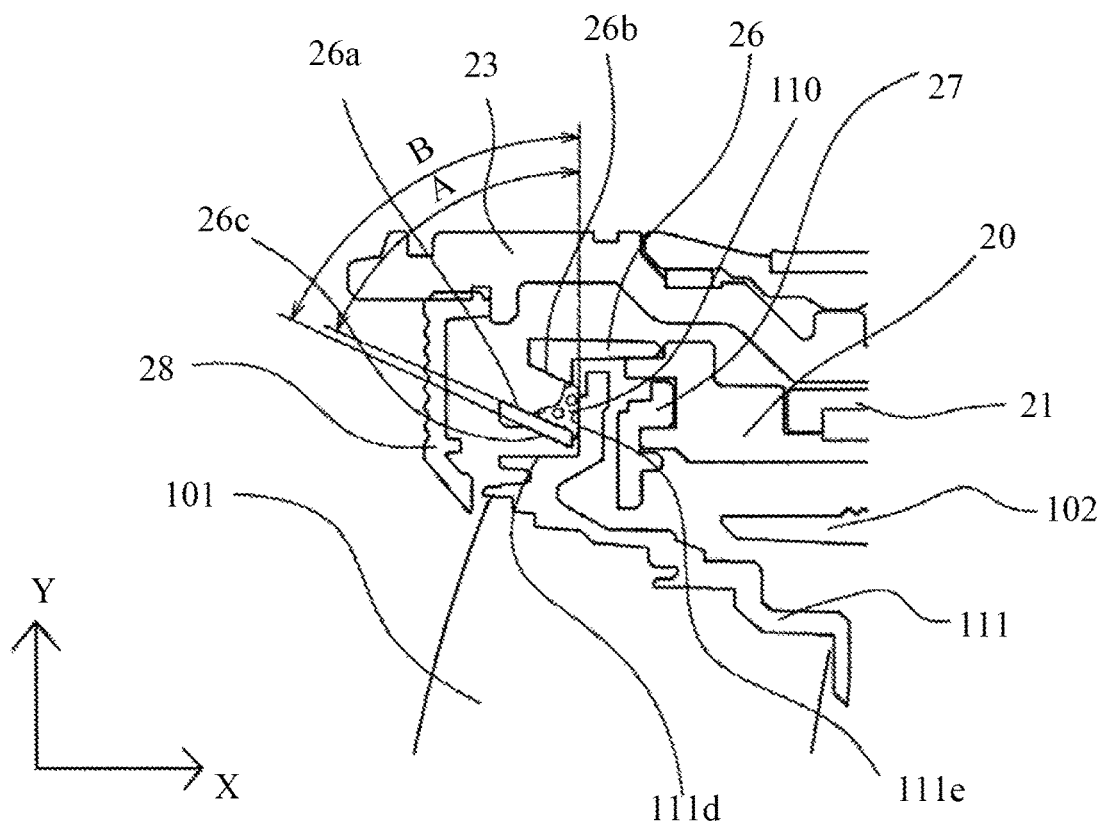
FIG. 7 is a sectional view of the first lens unit according to the first embodiment.

FIG. 7 is a sectional view of the first lens unit 101 (adhesive penetration hole 26e). The first lens holding frame 111 has the cylinder part 111d with a wall part parallel to the optical axis AXL. The adhesive is maintained between the cylinder part 111d of the first lens holding frame 111 and the second slope 26c. A flange bottom part 111e is a flange surface of the first lens holding frame 111 (which is orthogonal to or crosses with the optical axis), and forms the bottom of the adhesive penetration hole 26e. The flange bottom part 111e is a surface perpendicular to the optical axis AXL (X direction), and the first slope 26a forms an angle A relative to the flange bottom part 111e. The angle A is an acute angle less than 90° relative to the flange bottom part 111e. The adhesive 110 is applied to a space formed by the first slope 26a, the flange bottom part 111e, and the third slope 26b. The first lens holding frame 111 is fixed to the adjustment base 26 by providing the adhesive 110 between the first slope 26a and the flange bottom part 111e. The second slope 26c forms an acute angle relative to the wall surface (cylinder part 111d) parallel to the optical axis AXL. The first lens holding frame 111 is fixed to the adjustment base 26 by providing the adhesive 110 between the second slope 26c and the wall surface (cylinder part 111d).

In order for the conventional reservoir of the UV curing type adhesive to cure in response to the UV light, it is general to set the angle A to 90° or higher. However, when the first lens holding frame 111 displaces in the optical axis direction for adjustments, there is a space between the adjustment base 26 and the first lens holding frame 111. For example, when the interchangeable lens 2 drops and an inertia force in the minus X direction is applied to the first lens unit 101, the adhesive needs to absorb the force and it is necessary to prevent the adhesive peel and the shift of the optically adjusted position. While the adhesive is likely to peel when a shearing force is applied to the adhesion interface, the first slope 26a is an acute slope and thus a force is also applied to an adhesive compressing direction and the adhesive peel can be effectively prevented. In addition, since the angle A between the flange bottom part 111e and the first slope 26a is acute, the adhesive is cuneately adhered to the space between the flange bottom part 111e and the first slope 26a. Hence, it is expected that the adhesive can be prevented from peeling since the moving force of the first lens holding frame 111 in the decentering direction, which would otherwise attempt to peel the adhesive in the minus X direction, also works in the adhesive compressing direction. If a more strength is necessary to prevent the adhesive peel in the decentering direction and the position shift of the first lens holding frame 111, the adhesive can also be applied to the space between the second slope 26c and the cylinder part 111d.

Since the first slope 26a forms the acute angle A, when the UV light is irradiated from the lens front side (minus X side), the adhesive in the shade part may be insufficiently cured. However, this problem can be solved by developing an oblique UV irradiation tool, and thus the assembly performance cannot be impaired. This embodiment uses the UV curing type adhesive, but another curing type adhesive may be used as long as the optical performance does not change after curing.

Figure 8:
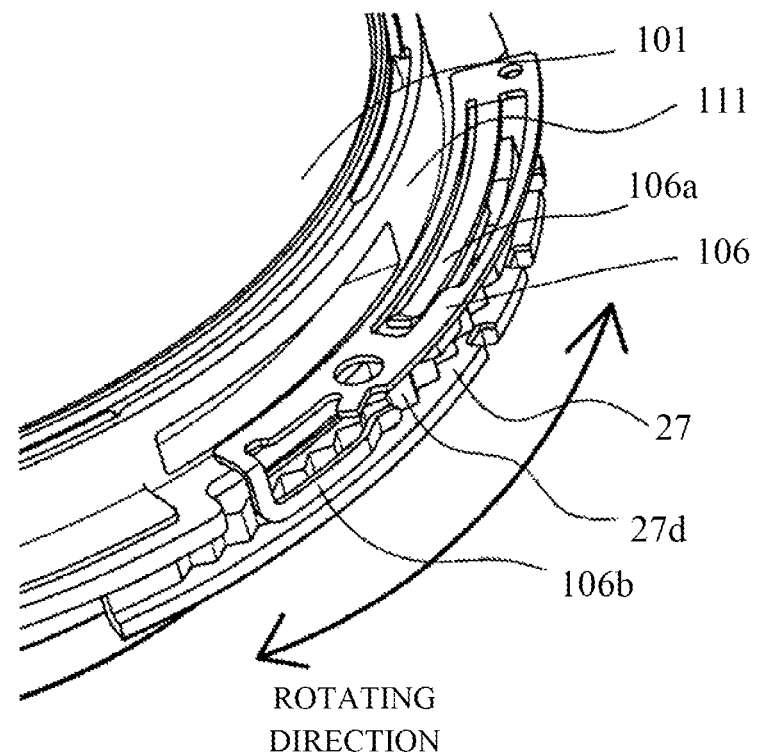
FIG. 8 is a perspective view of a first-unit urging spring according to the first embodiment.

FIG. 8 is a perspective view of the first-unit urging spring 106. The first-unit urging spring 106 is fixed to the adjustment base 26 as described above, but the adjustment base 26 is not illustrated for description purposes. A thrust urging part 106a includes a flat spring that forces the first lens holding frame 111 towards the rotational ring 27. A click spring part 106b contacts the click undulator 27d in the rotational ring 27, and deforms to provide the click sense as the rotational ring 27 rotates.

Figure 9:
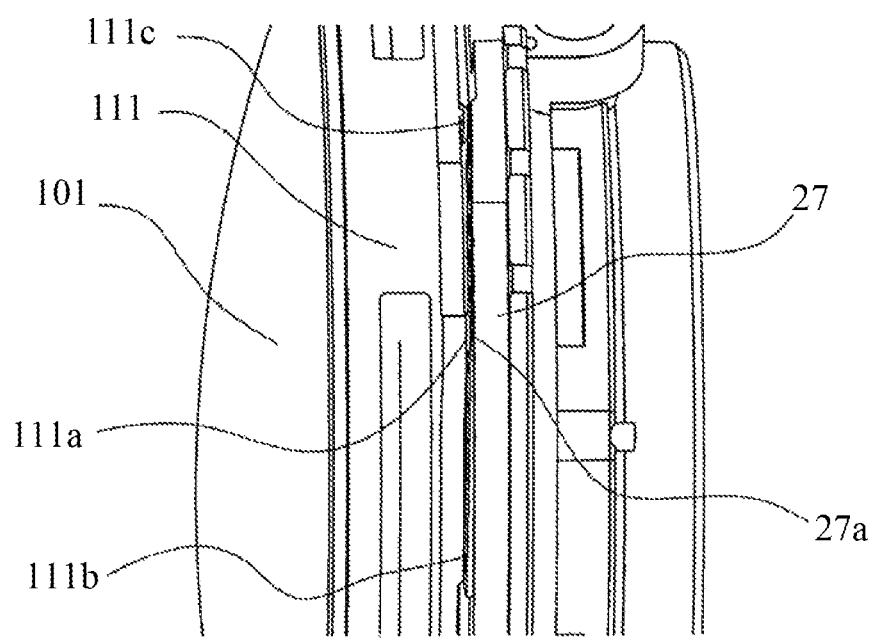
FIG. 9 is a side view of the first lens unit according to the first embodiment.

FIG. 9 is a side view of the first lens unit 101 (first lens holding frame 111 and the rotational ring 27). The first lens holding frame 111 contacts the stair middle surface 27a through the contact part 111a. Auxiliary contact parts 111b and 111c are provided to the first lens holding frame 111, and located at positions opposite to the stairs part of the rotational ring 27. When the rotational ring 27 rotates and the contact position between the contact 111a and the stair middle surface 27a changes, the step of the stair middle surface 27a is engaged with the contact part 111a and the contact position changes. FIG. 9 illustrates the one position, but this embodiment provides three contact parts 111a and three stair middle surfaces 27a and each contact part 111a goes beyond the step at different timings. Hence, the inclination the first lens holding frame 111 to the rotational ring 27 changes, but the large inclination may make the rotational ring 27 hard to rotate. Accordingly, the auxiliary contact parts 111*b* and 111*c* are separated from the contact part 111*a* by predetermined distances and arranged so that they contact the stairs part, and the first lens holding frame 111 is restricted from inclining beyond a predetermined amount.

As illustrated in FIGS. 7 to 9, the rotational ring 27 is located on the image plane side of the first lens holding frame 111 and enclosed by the adjustment base 26 once the adjustment base 26 is fixed to the guide cylinder 20. The rotational ring 27 can be touched or rotated only through the adjustment penetration hole 26*d*. In other words, the adhesive 110 according to this embodiment serves to fix the position of the rotational ring 27 in the optical axis direction in addition to the position of the first lens holding frame 111. For example, the outer surface of the adjustment base 26 is bored and the rotational ring 27 can be fixed, for example, with the adhesive, through the bore. However, the adhesive 110 inside the adjustment base 26 cannot be visually recognized in this adhesion operation, and it is difficult to confirm the applied state and the flow of the adhesive 110. Thus, this embodiment provides the adhesive penetration holes 26*e* that can be visually recognized from the object side and has the first slope 26*a* for a strong adhesion in the optical axis direction. In other words, this embodiment makes the adhesive applied area easier to view than ever and improves the adhesive applying operability.

Figure 10A:
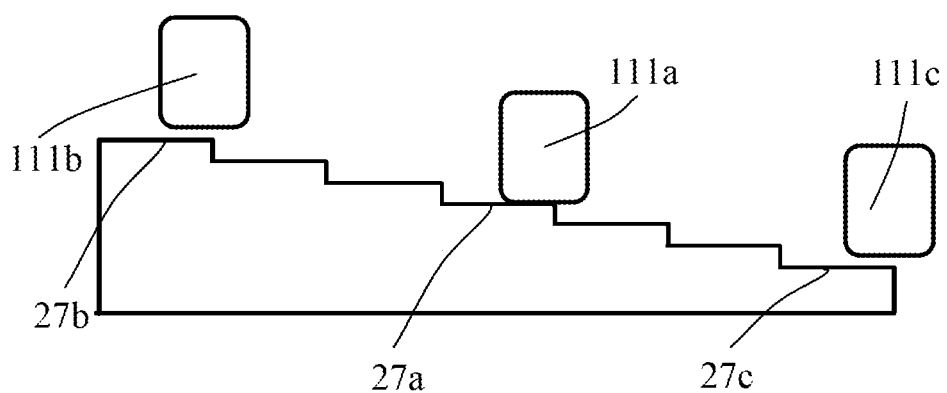
FIG. 10A to 10C are typical views of a contact part and a stairs part according to the first embodiment.
Figure 10B:
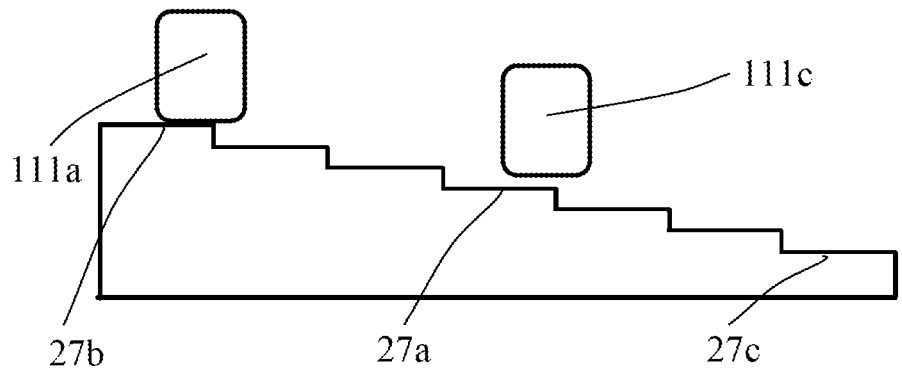
Figure 10C:
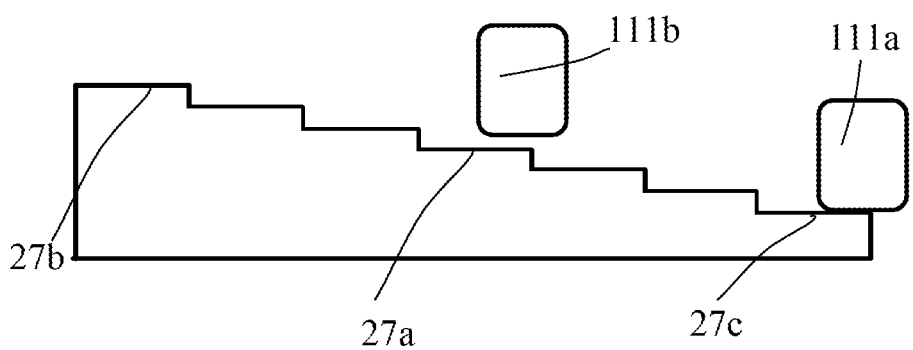
Figure 10C:

FIGS. 10A to 10C are schematic views illustrating contact states among the contact part 111*a*, the auxiliary contact parts 111*b* and 111*c*, and the stairs part (contact part 27*a*, stair top surface 27*b*, and stair bottom surface 27*c*). The stair top surface 27*b* and the stair bottom surface 27*c* are both end surfaces of the stairs part. The stairs part according to this embodiment has totally thirteen surfaces, or ±6 surfaces with respect to the stair middle surface 27*a*, but FIGS. 10A to 10C schematically illustrates only ±3 surfaces. The position of the first lens unit 101 in the optical axis direction is adjusted as the rotational ring 27 rotates and the contact part 27*a* goes up and down the stairs part.

FIG. 10A illustrates the contact state between the contact part 111*a* and the stair middle surface 27*a*. At this time, the auxiliary contact part 111*b* is opposite to and spaced from the stair top surface 27*b* by a certain distance, and the auxiliary contact part 111*c* is opposite to and spaced from the stair bottom surface 27*c* by a certain distance. As described above, the inclination of the first lens holding frame 111 is restricted.

FIG. 10B illustrates the contact state between the contact part 111*a* and the stair top surface 27*b*. At this time, the auxiliary contact part 111*c* is opposite to the and spaced from stair middle surface 27*a* by a certain distance. The auxiliary contact part 111*b* moves to a position that is not opposite to the stairs part, but the contact part 111*a* and the auxiliary contact part 111*c* restrict the first lens holding frame 11 from inclining.

FIG. 10C illustrates the contact state between the contact part 111*a* and the stair top surface 27*b*. At this time, the auxiliary contact part 111*b* is opposite to and spaced from the stair middle surface 27*a* by a certain distance. The auxiliary contact part 111*c* moves to a position that is not opposite to the stairs part, but the contact part 111*a* and the auxiliary contact part 111*b* restrict the first lens holding frame 111 from inclining.

Each stair surface has a constant area, and the contact part 111*a* can move in the area. Thereby, decentering of the first lens unit 101 can be adjusted. However, the rotational ring 27 is rotated through the adjustment penetration hole 26*d* while enclosed by the adjustment base 26, and the inappropriate rotation position may reduce the area contactable by the contact part 111*a* and make insufficient the decentering adjustment range. Accordingly, the above click mechanism roughly guarantee that the position where the click spring part 106*b* is engaged with the concave in the click undulator 27*d*, means that the rotational ring 27 is located at an appropriate position, facilitating the adjustment.

In order to improve the operability and the adhesion reliability in manufacturing the interchangeable lens 2, this embodiment applies the adhesive 110 to the space between the second slope 26*c* and the wall surface (cylinder part 111*d*) after the adhesive 110 is applied to the space between the first slope 26*a* and the flange surface.

Second Embodiment

Figure 11:
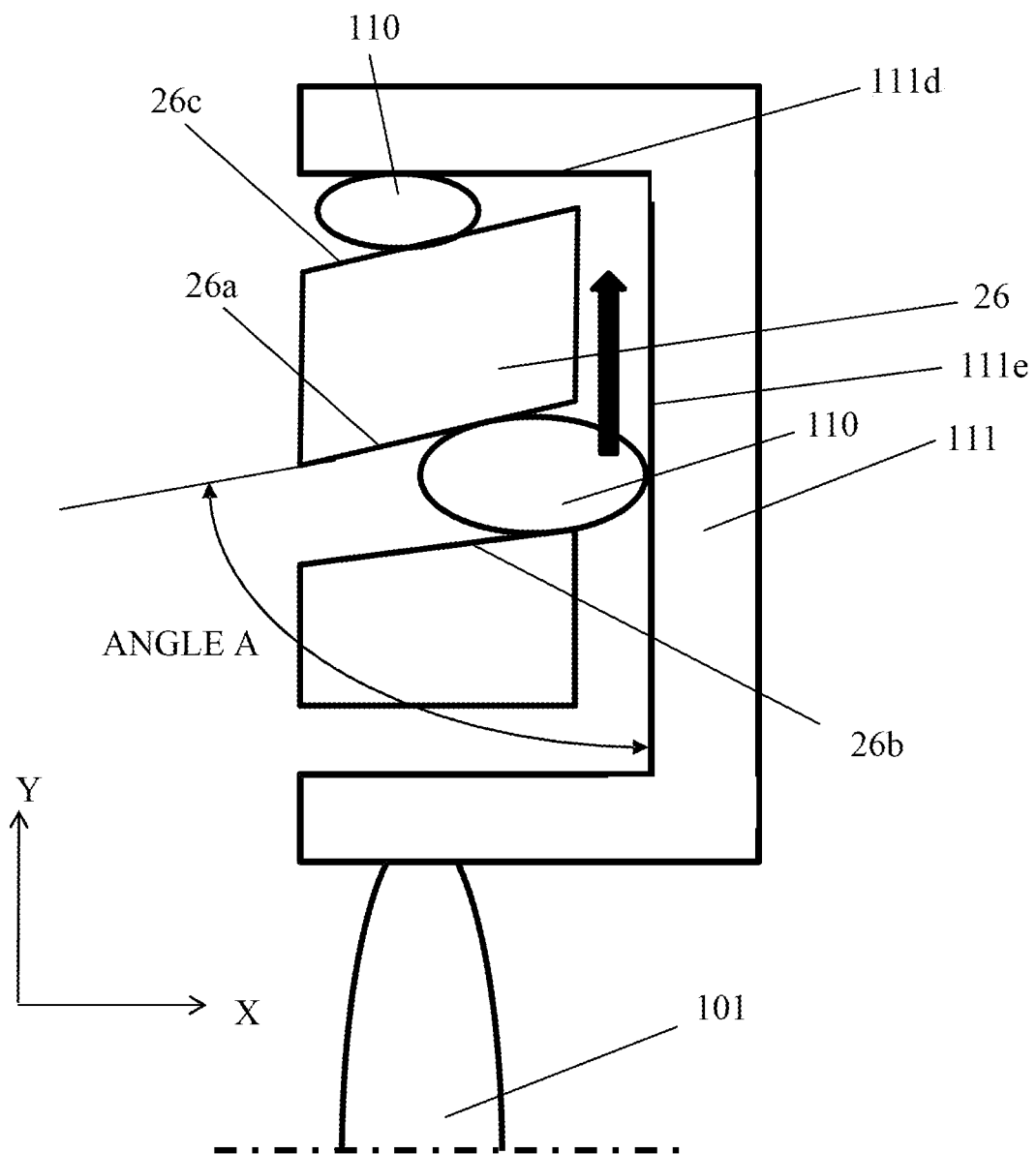
FIG. 11 is a schematic sectional view of a first lens unit according to the second embodiment.

Next follows a description of a second embodiment of the present invention. FIG. 11 is a schematic sectional view of the first lens unit 101 after the arrangement among the first slope 26*a*, the third slope 26*b*, and the second slope 26*c* is changed.

In FIG. 7, the angle A between the first slope 26*a* and the flange bottom part 111*e* is acute in the plus Y direction. On the other hand, according to this embodiment, the angle A is acute in the minus Y direction as illustrated in FIG. 11. Even this structure can prevent the adhesive from peeling since the first slope 26*a* is an acute slope and a force also works in the adhesive compressing direction. In addition, since the angle A between the flange bottom part 111*e* and the first slope 26*a* is acute, the adhesive can be cuneately adhered to the space between the flange bottom part 111*e* and the first slope 26*a*. Hence, it is expected that the adhesive can be prevented from peeling since the moving force of the first lens holding frame 111 in the decentering direction, which would otherwise attempt to peel the adhesive in the minus X direction, also works in the adhesive compressing direction.

As the angle A becomes smaller, the force becomes larger that works in the adhesive compressing direction. In this case, it is necessary to incline the UV light for curing the adhesive along with the angle A, but the UV irradiation becomes difficult and the tool would need a larger size. On the other hand, as the angle A becomes closer to 90°, it becomes easier to irradiate the UV light to the adhesive but the force in the adhesive compressing direction becomes smaller. When the first lens unit 101 is heavy, the angle A is made smaller. When the first lens unit 101 is lightweight, the angle A is made larger. The angle A may be determined based on the UV irradiating operability. If necessary, the adhesive is applied to the space between the second slope 26*c* and the cylinder part 111*d*, and the holding strength in the decentering direction may be improved.

This embodiment sets the first slope 26*a* approximately parallel to the third slope 26*b*, but the present invention is not limited to this embodiment. The third slope 26*b* may have an angle smaller than the angle A for easy UV irradiations. The first slope 26*a* and the second slope 26*c* have the same phase in the circumferential direction of the first lens unit 101 (adjustment base 26). This is because when the adhesive 110 flows out in the thick arrow direction, the flow can be prevented by the adhesive applied to the second slope 26*c* side (or the flow of the adhesive from the second slope 26*c* side is prevented by the adhesive on the first slope 26*a* side). As long as the flow can be prevented by another component or the component shape, another phase may be used. Even when the first slope 26*a* and the second slope 26*c* are not parallel to each other, the function cannot be impaired.

Each embodiment can provide a lens apparatus, an imaging apparatus, and a manufacturing method of the lens apparatus, which can maintain the adhesion operability and the high adhesion reliability. Thus, even when the lens unit or lens is moved in the thrust direction or decentering direction by the optical adjustment, the adhesion strength can be secured and the optical performance of the lens barrel can be prevented from degrading upon impact etc.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

More specifically, this embodiment discusses the structure of the light amount adjusting apparatus suitable for focusing, but a similar structure may be used for the light amount adjustment in the magnification varying operation in the optical system. A material suitable for the design function is not limited.

This application claims the benefit of Japanese Patent Application No. 2017-152851, filed on Aug. 8, 2017 which is hereby incorporated by reference herein in its entirety.

What is claimed is:

1. A lens apparatus comprising:
   a lens;
   a first base member; and
   a holding frame configured to hold the lens, the holding frame including a flange surface, an extended surface of which intersects an optical axis of the lens,
   wherein the first base member has a first slope that forms an acute angle to the flange surface in a cross section including the optical axis,
   wherein the holding frame is fixed to the first base member by adhesive provided between the first slope and the flange surface,
   wherein the holding frame has a wall surface,
   wherein the first base member has a second slope that forms an acute angle to the wall surface in the cross section, and
   wherein the holding frame is fixed to the first base member by adhesive provided between the second slope and the wall surface.

2. The lens apparatus according to claim 1, wherein the first slope is at least a part of an internal wall of a hole part provided to the first base member.

3. The lens apparatus according to claim 1, further comprising a first adjusting member configured to adjust a position of the holding frame relative to the first base member.

4. The lens apparatus according to claim 3, wherein the first adjusting member adjusts at least an inclination of the holding frame to the optical axis, the position of the holding frame in each of an optical axis direction and a direction orthogonal to the optical axis, or both the inclination of the holding frame to the optical axis and the position of the holding frame in each of the optical axis direction and the direction orthogonal to the optical axis.

5. The lens apparatus according to claim 3, wherein the first adjusting member includes cam rollers arranged at three positions of the holding frame.

6. The lens apparatus according to claim 1, wherein the second slope has a same phase as the first slope in a circumferential direction of the first base member.

7. A lens apparatus comprising:
   a lens;
   a first base member;
   a holding frame configured to hold the lens, the holding frame including a flange surface, an extended surface of which intersects an optical axis of the lens;
   a second base member onto which the first base member is fixed; and
   a second adjusting member supported rotatably to the second base member, and configured to adjust a position of the holding frame in an optical axis direction by a rotation,
   wherein the first base member has a first slope that forms an acute angle to the flange surface in a cross section including the optical axis, and
   wherein the holding frame is fixed to the first base member by adhesive provided between the first slope and the flange surface.

8. The lens apparatus according to claim 1, wherein the first base member has a plurality of first slopes.

9. An imaging apparatus comprising:
   a lens apparatus according to claim 1; and
   an image sensor configured to photoelectrically convert an optical image formed by the lens apparatus.

10. A manufacturing method of a lens apparatus that includes a lens, a first base member, a holding frame that is configured to hold the lens and has a flange surface, an extended surface of which intersects an optical axis of the lens, the manufacturing method comprising:
    a first step of fixing the holding frame to the first base member by applying adhesive between a first slope of the first base member and the flange surface; and
    a second step of fixing the holding frame to the first base member by applying adhesive to a second slope of the first base member and a wall surface of the holding frame,
    wherein the first slope forms an acute angle to the flange surface in a cross section including the optical axis, and
    wherein the second slope forms an acute angle to the wall surface in the cross section.

* * * * *